United States Patent
Fredd et al.

(10) Patent No.: US 7,350,572 B2
(45) Date of Patent: Apr. 1, 2008

(54) METHODS FOR CONTROLLING FLUID LOSS

(75) Inventors: Christopher Fredd, Missouri City, TX (US); Bernhard Lungwitz, Stafford, TX (US); Brad Holms, Katy, TX (US); John Engels, The Woodlands, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/206,898

(22) Filed: Aug. 18, 2005

(65) Prior Publication Data

US 2006/0042797 A1    Mar. 2, 2006

Related U.S. Application Data

(60) Provisional application No. 60/606,270, filed on Sep. 1, 2004.

(51) Int. Cl.
*E21B 43/26* (2006.01)
*E21B 43/27* (2006.01)
*E21B 43/22* (2006.01)

(52) U.S. Cl. .............. 166/279; 166/300; 166/282; 166/283; 166/280.1; 166/308.1; 166/312; 166/307; 166/304

(58) Field of Classification Search .............. None
See application file for complete search history.

(56) References Cited

U.S. PATENT DOCUMENTS

| | | | |
|---|---|---|---|
| 3,998,272 A | 12/1976 | Maly | |
| 4,957,166 A * | 9/1990 | Sydansk | 166/295 |
| 5,258,137 A | 11/1993 | Bonekamp et al. | |
| 5,330,005 A | 7/1994 | Card et al. | |
| 5,377,760 A * | 1/1995 | Merrill | 166/295 |
| 5,439,055 A | 8/1995 | Card et al. | |
| 5,501,275 A | 3/1996 | Card et al. | |
| 5,551,516 A | 9/1996 | Norman et al. | |
| 5,964,295 A | 10/1999 | Brown et al. | |
| 5,979,557 A | 11/1999 | Card et al. | |
| 6,025,304 A * | 2/2000 | Southwell et al. | 507/225 |
| 6,085,844 A * | 7/2000 | Palmer et al. | 166/312 |
| 6,172,011 B1 | 1/2001 | Card et al. | |
| 6,419,019 B1 * | 7/2002 | Palmer et al. | 166/311 |
| 6,435,277 B1 | 8/2002 | Qu et al. | |

(Continued)

FOREIGN PATENT DOCUMENTS

EP    0278540 B1    8/1992

OTHER PUBLICATIONS

U.S. Patent Application entitled, "Degradable Fiber Systems For Stimulation". U.S. Appl. No. 11/156,966.

*Primary Examiner*—Zakiya W. Bates
*Assistant Examiner*—Angela DiTrani
(74) *Attorney, Agent, or Firm*—Darla Fonseca; Dave Cate; Robin Nava

(57) ABSTRACT

A method of treatment of subterranean formations in which leakoff through natural fractures is controlled through the use of fibers. The method involves pumping a mixture of a formation treatment fluid and a fiber into the formation for matrix stimulation, fracture stimulation, diversion, and/or water control. In carbonate formations, the formation treatment fluid is preferably an in situ gelled acid. The method optionally also involves pumping the same or a different formation treatment fluid without fiber.

16 Claims, 3 Drawing Sheets

U.S. PATENT DOCUMENTS

| | | |
|---|---|---|
| 6,599,863 B1 | 7/2003 | Palmer et al. |
| 6,667,280 B2 | 12/2003 | Chang et al. |
| 6,703,352 B2 | 3/2004 | Dahayanake et al. |
| 6,776,235 B1 * | 8/2004 | England .................. 166/271 |
| 6,777,377 B2 * | 8/2004 | Myers et al. ............. 507/120 |
| 6,938,693 B2 * | 9/2005 | Boney et al. ............ 166/280.1 |
| 7,114,567 B2 * | 10/2006 | Chan et al. ............. 166/280.1 |
| 2003/0062160 A1 * | 4/2003 | Boney et al. ............ 166/278 |
| 2003/0119680 A1 | 6/2003 | Chang et al. |
| 2004/0152601 A1 * | 8/2004 | Still et al. ............... 507/100 |
| 2004/0152604 A1 | 8/2004 | Qu et al. |
| 2005/0113263 A1 | 5/2005 | Brown et al. |
| 2005/0126786 A1 | 6/2005 | Fu et al. |
| 2006/0032633 A1 | 2/2006 | Nguyen |

\* cited by examiner

METHODS FOR CONTROLLING FLUID LOSS

CROSS REFERENCE TO RELATED APPLICATION

This application claims the benefit of U.S. Provisional Application 60/606,270, filed Sep. 1, 2004, which is incorporated herein by reference.

BACKGROUND OF THE INVENTION

The present invention relates to a method for controlling fluid loss from a subterranean formation. More specifically, the present invention relates to methods for controlling the loss of well treatment fluids, such as fluids used for stimulating production of hydrocarbons from such formations, fluids used for diverting the flow of fluids, fluids used for controlling water production, pad stages for conventional propped fracturing treatments, solvent treatments, and in general, any fluid used in treating a formation.

The flow of fluids through porous media, for example the production of fluids from wells, is governed by three principle factors: the size of the flow path, the permeability of the flow path, and the driving force. It is often necessary to stimulate the production of fluids from subterranean formations when wells are not producing satisfactorily. The failure to produce is typically due to an inadequate, or a damaged, path for fluids to flow from the formation to the wellbore. This damage may be because the formation inherently has insufficient porosity and/or permeability, or because the porosity and/or permeability have been decreased (damaged) near the wellbore during drilling and/or completion and/or production.

There are two main stimulation techniques: matrix stimulation and fracturing. Matrix stimulation is accomplished by injecting a fluid (e.g., acid or solvent) to dissolve and/or disperse materials that impair well production or to create new, unimpaired flow channels between the wellbore and a formation. Matrix stimulation, typically called matrix acidizing when the stimulation fluid is an acid, generally is used to treat only the near-wellbore region. In a matrix acidizing treatment, the acid used (typically hydrochloric acid for carbonate formations) is injected at a pressure low enough to prevent fracturing the formation.

When acid is pumped into a subterranean formation, such as a carbonate (for example, limestone or dolomite) formation, at pressures below the fracture pressure, the acid flows preferentially into the highest solubility or the highest permeability (that is, largest pores, vugs or natural fractures) regions. Acid reaction in the high-solubility or high-permeability region ideally causes the formation of large, highly conductive flow channels called wormholes that form approximately radially from the wellbore. However, acid that enters vugs or natural fractures may be substantially wasted, and low permeability regions may be untreated.

In fracturing, on the other hand, a fluid is forced into the formation at a pressure above that at which the formation rock parts to create an enlarged flow path. When the pressure is released, the fracture typically closes and the new flow path is not maintained unless the operator provides some mechanism by which the fracture is held open. There are two common ways of holding the fracture open. In conventional propped hydraulic fracturing, a viscous fluid (pad stage) is injected to generate or propagate a fracture. Subsequent stages of viscous fluid carry solid proppant that is trapped in the fracture when the pressure is released, preventing the fracture from fully closing. In acid fracturing, also known as fracture acidizing, the fracture is generated and subsequently treated with an acid. In this case, however, the treatment parameters are commonly adjusted so that wormholing does not occur. Instead, the object is to etch the faces of the fracture differentially. Then, when the pressure is released, the fracture does not close completely because the differential etching has created a gap, or non-matching uneven surfaces, where material has been removed. Ideally the differential etching forms flow channels, usually running along the faces of the fracture from the tip to the wellbore, that enhance production.

Although the following discussion will focus for the most part on matrix acidizing (treatment with formation dissolving fluids (FDF's), not all of which are acids), similar problems affect matrix stimulation, hydraulic fracturing with proppants, acid fracturing, and other methods, such that this discussion is entirely applicable to all types of formation treatment fluids (FTF's). Note that FDF's are a subset of FTF's, and that, as defined here, FDF's include fluids that dissolve the formation or damage in the formation, such as scale and invaded drilling fluids.

A problem that limits the effectiveness of FTF's is incomplete axial distribution. This problem relates to the proper placement of the fluid, i.e., ensuring that the fluid is delivered to the desired zone (i.e., the zone that needs treatment) rather than another zone. More particularly, when an acid is injected into a carbonate formation, the acid typically begins to dissolve the material in the wellbore and/or the matrix near the wellbore. Depending upon the reactivity of the acid with the matrix and the flow rate of acid to the reaction location, as one continues to pump acid into the formation, a dominant channel through the matrix is often created. As one continues to pump acid into the formation, the acid flows along that newly created channel as the path of least resistance and therefore leaves the rest of the formation substantially untreated. This behavior is exacerbated by the intrinsic permeability heterogeneity (common in many formations) of the formation, especially the presence of natural fractures and high permeability streaks in the formation. These regions of heterogeneity attract large amounts of the injected acid, hence keeping the acid from reaching other parts of the formation along the wellbore where it is actually desired most. Thus, in naturally fractured reservoirs, a substantial portion of the productive, oil- or gas-bearing intervals within the zone to be treated are not contacted by acid sufficient to penetrate deep enough (laterally in the case of a vertical wellbore) into the formation matrix to effectively increase formation permeability, and therefore its capacity for delivering oil and/or gas to the wellbore. This problem of proper placement is particularly vexing since the injected fluid preferentially migrates to higher permeability zones (the path of least resistance) rather than to lower permeability zones, yet it is those latter zones that generally require the acid treatment (i.e., because they are low permeability zones, the flow of oil and/or gas through them is diminished). In response to this problem, numerous techniques have been developed to achieve more controlled placement of the fluid, diverting the acid away from naturally high permeability zones, and zones already treated, to the regions of interest.

Techniques to control acid leakoff (i.e., to ensure effective zone coverage) can be roughly divided into either mechanical or chemical techniques. Mechanical techniques include ball sealers (balls dropped into the wellbore to plug the perforations in the well casing, thus sealing the perforation against fluid entry), packers (particularly straddle packers that seal off portion of the wellbore and thereby prevent fluid entry into the perforations in that portion of the wellbore) and bridge plugs, coiled tubing (flexible tubing deployed by a mechanized reel, through which the acid can be delivered to a more precise location within the wellbore), and bullheading (attempting to achieve diversion by pumping the acid at the highest possible pressure-just below the pressure that would actually fracture the formation). Chemical techniques can be further divided into techniques that chemically modify the wellbore adjacent the portions of the formation for which acid diversion is desired, and techniques that modify the acid-containing fluid itself. The first type involves particulate materials that form a reduced-permeability cake on the wellbore face that, upon contact with the acid, diverts the acid to lower permeability regions. These materials are typically either oil-soluble or water-soluble particulates that are directed at the high permeability zones to plug them and therefore divert acid flow to the low permeability zones. The second type includes foaming agents, emulsifying agents, and gelling agents. Mechanical methods and chemical methods that chemically modify the wellbore adjacent portions of the formation for which acid diversion is desired will not be considered further here.

Emulsified acid systems and foamed systems are commercially available responses to the diversion problem, but operational complexity sometimes limits their use. For instance, friction pressures may be high. In addition, these fluids are not effective at diverting fluids from natural fractures. Gelling agents are commercially available, but do not provide viscosity contrasts sufficient to provide fluid diversion from natural fractures. Some commercially available systems are polymeric cross-linked systems, i.e., they are linear polymers when pumped, but a chemical agent pumped along with the polymer causes the polymers to aggregate or cross-link once in the formation (e.g., due to a change in pH caused by reaction of the acid), which results in gelling. Although these in situ cross-linked polymer fluids can be effective in controlling fluid loss through wormholes, they are ineffective at controlling losses through natural fractures. In addition, these systems leave a polymer residue in the formation, which can damage the formation, resulting in diminished hydrocarbon production.

The use of viscoelastic surfactant-based gelling systems can avoid the damage to the formation caused by polymer-based fluids. Some viscoelastic surfactant-based gelling systems are disclosed in U.S. Pat. Nos. 5,979,557, 6,435,277, and 6,703,352 which have a common Assignee as the present application. The use of viscoelastic surfactant-based gelling systems to control leak-off is disclosed in U.S. Pat. No. 6,667,280 and U.S. Patent Application Publication No. 2003-0119680, which also have a common Assignee as the present application. Viscoelastic diverting acids (VDA's) were developed for carbonate matrix acidizing and have an initial nearly water-like viscosity, but after a considerable portion of the acid is spent, or consumed, in a carbonate formation that reacts with acid, viscosity increases substantially. Thus, when first injected, VDA's enter the most permeable zone(s), but when they gel, they block that zone or zones and divert subsequently injected fluid into previously less-permeable zones. The success of such systems depends upon the ability of the formation to react with a large amount of acid. Consequently, they are most useful with carbonates that have a large capacity to react with acid.

Although in situ gelation techniques are generally effective for controlling leakoff in the rock matrix and wormholes along the wellbore or fracture face, they are not particularly effective in controlling leakoff through natural fractures and/or into vugs. The relatively large natural fracture widths, conductivity, and volume render the conventional approaches either ineffective or inefficient, requiring a large volume of fluid to fill the natural fractures before reasonable fluid loss control can be achieved. This limitation has been observed when acidizing carbonate formations with large natural fractures; extremely large fluid volumes and multiple VDA stages are required before evidence of diversion is observed. It is, therefore, an object of embodiments of the present invention to provide a method for effectively controlling leakoff during oilfield treatments in naturally fractured formations.

It is known to use fibers to control fluid loss in solid laden fluids such as cement. Cement slurries containing a distribution of solid particles and glass fibers, for instance, have been pumped into the wellbore with the intention of depositing the particles and fibers in a mat at the fracture so as to physically block the fracture and reduce fluid loss. Similarly, fibers have been used in slickwater (water plus friction reducer) proppant fracturing treatments to assist in the transport of proppant along the fracture. However, the treatments have been known to screen out as soon as proppant stages containing fibers reach the formation. In such cases, where rock parameters and job design limited frac width, fibers were effective in bridging fractures that were less than about 0.25 cm (0.1 inches) in width.

Better methods of controlling leak off of treatment fluids into natural fractures are needed.

SUMMARY OF THE INVENTION

In a first aspect, the present invention provides a method for controlling fluid loss from a subterranean formation including the steps of preparing a mixture of a formation treatment fluid (FTF) and a fiber and injecting that mixture into a subterranean formation through a wellbore.

In another aspect, the present invention provides a method for controlling fluid loss from a subterranean formation including the steps of contacting the subterranean formation with a formation treatment fluid, preferably a formation-dissolving fluid (FDF) (for example, VDA in carbonate acidizing), and contacting the formation with a mixture of a formation treatment fluid and a fiber.

In another aspect, the present invention also provides a method for stimulating a hydrocarbon-containing formation including the steps of (a) contacting a subterranean formation with a formation treatment fluid such as a formation-dissolving fluid, (b) contacting the subterranean formation with a mixture of a formation treatment fluid, preferably an in situ gelled FTF in carbonate acidizing, and a fiber to divert the FDF from natural fractures in the formation, and (c) optionally repeating steps (a) and (b) as needed for subsequent stimulation of one or more zones other than and/or in addition to the naturally fractured zone or zones of the formation. Optionally, the steps may be alternated starting first with step (b). In either case, either step may be the last step.

Another object of one of the embodiments of the present invention is to utilize fibers in non-proppant laden formation treatment fluids to control fluid loss to natural fractures. Applications include pad stages of hydraulic fracturing treatments with proppant and acid fracturing treatments, matrix acidizing fluids, formation treating fluids (as an example, chelating solvents), diverting fluids (emulsions and foams, for instance), self-diverting fluids, and water control fluids. The use of fibers aids in the bridging of natural fractures, thereby reducing fluid loss to natural fractures. In the case of acidizing, the use of fibers alone is not as effective in diversion from the natural fractures, as subsequent acid stages can rapidly dissolve the formation around the fibers and re-open the natural fractures. However, any acid plus fiber, or FDF plus fiber or any stimulation fluid plus fiber may be used, although a viscous acid is preferred, and VDA plus fiber is more preferred.

In particular, it is an object of embodiments of the present invention to control leakoff and divert an FTF away from natural fractures utilizing a combination of treatment fluids and fibers, preferably an in situ gelled FTF plus fibers, more preferably a surfactant-based in situ gelled acid and fibers (for example, in a carbonate formation), more preferably a surfactant-based in situ gelled acid such as but not limited to a viscolelastic diverting agent (VDA), and fiber (such as glass, PLA, PGA, PVA, or other fibers) to provide dynamic viscosity increases as the acid spends in the natural fracture along with fiber bridging of the natural fractures.

It is also an object of embodiments of the present invention to provide a method that results in the combination of the formation of a viscous plug that prevents subsequent FTF leakoff to the formation and a fiber that provides fracture bridging that allows for leakoff control without using excessive volumes of fluid.

Another object of embodiments of the present invention is to provide a method of diverting from one acid fracture to another acid fracture without the use of mechanical diversion techniques such as ball sealers.

Yet another object of embodiments of the present invention is to provide a method of diverting from a high permeability zone or a zone containing natural fractures to another zone with low permeability during matrix acidizing treatments and acid fracturing treatments.

It has also been discovered that the present method has application for fluid control in other situations. For instance, the inclusion of fibers in viscous kill pills can be used to enhance placement and effectiveness of fluids in naturally fractured formations. The method of the present invention has even broader applicability in that it is contemplated that it is effective with any formation treatment fluid, proppant-laden or non-proppant laden, including fracturing fluids, FDF's, solvents such as toluene and xylene, diverters such as foam, water control gels, and surfactant-based systems.

DETAILED DESCRIPTION OF PREFERRED EMBODIMENTS

Figure 1:
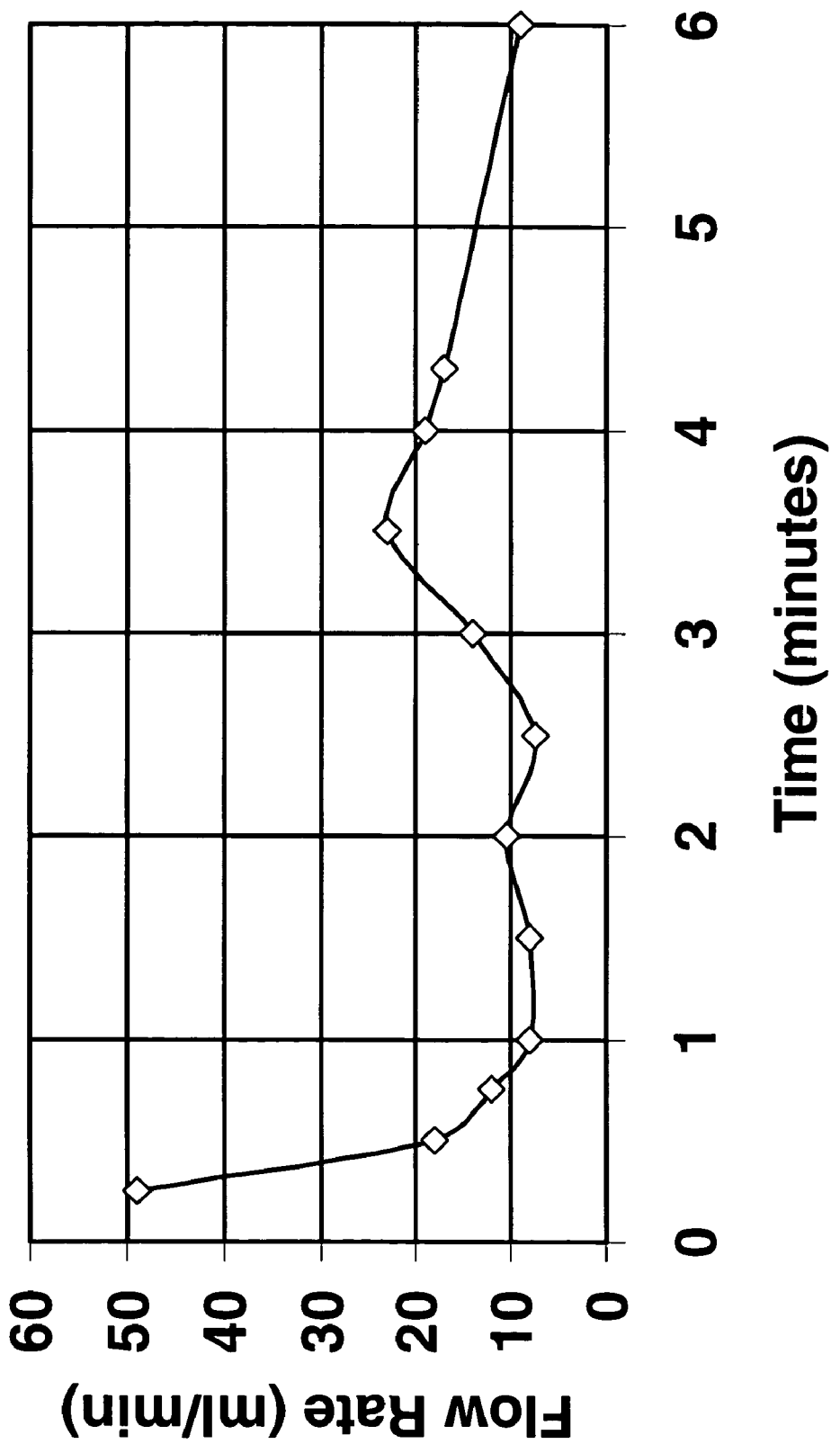
FIG. 1 shows laboratory data for the rate of fluid loss with VDA plus fiber pumped through an 0.3 cm (0.12 inch) wide by 2.54 cm (1 inch) high by 15.2 cm (6 inch) long fracture created between two Indiana Limestone cores at 93° C. (200° F.).

Although the terms acidizing and acid fracturing are utilized herein because they are so ingrained in the industry, instead of the term "acid," it is appropriate to use the term "formation-dissolving fluid" (FDF) because acids are not the only reactive fluids that dissolve formation minerals. In some optimized methods of generating etched fracture faces far from the wellbore, for instance, acids are not the optimally reactive fluids. In addition to known gelled acids, emulsified acids, retarded acids which use either inorganic or organic acids, or mixtures of these conventional acids, new reactive fluids which use mainly chelant systems have also been developed and have been shown to generate wormholes in carbonate formations when the overall process of stimulation is optimized. Examples of such formation-dissolving fluids include such chelating agents as aminopolycarboxylic acids and their salts, for example ethylenediaminetetraacetic acid, diethylenetriaminepentaacetic acid, hydroxyethylethylenediaminetriacetic acid, and hydroxyethyliminodiacetic acid, sometimes called "non-acid reactive solutions" (NARS) when they are basic. Other fluids, referred to herein generically as formation treatment fluids, are also injected into wells, for example for purposes such as water control or as solvents for dissolving such materials as scales, residues from drilling fluids, filter cakes, paraffins and/or asphaltenes.

Although the following discussion will focus for the most part on matrix acidizing (treatment with formation dissolving fluids (FDF's, not all of which are acids)), similar problems affect matrix stimulation, hydraulic fracturing with proppants, acid fracturing, and other methods, such that this discussion is entirely applicable to all types of formation treatment fluids (FTF's). Note that FDF's are a subset of FTF's, and that, as defined here, FDF's include fluids that dissolve damage in the formation, such as scale and invaded drilling fluids. Also, although the method will be described here primarily as a method to block and divert fluid from natural fractures, it may also be used to block and divert fluid from man-made fractures, from vugs, and from extremely high permeability streaks.

In accordance with one embodiment of the method of the present invention, alternating stages first of a mixture of an in situ gelled acid and a fiber and second of a formation-dissolving fluid (FDF) are pumped into the wellbore for successive stimulation of newly accessible zones. The acid and the FTF may be the same. A polymer-based self-diverting acid (SDA; see below)-fiber mixture is utilized to advantage in the method of the present invention, but in a preferred embodiment, a viscoelastic diverting acid (VDA) is mixed with a fiber because the VDA is a less damaging fluid. The in situ gelled acid-fiber stages provide diversion control and the FDF, which may, for example, be a conventional, delayed, gelled, or self-diverting acid system (e.g. HCl, organic acid, emulsified acid, gelled acid, or VDA) provides subsequent stimulation of the newly-accessible zones. As used herein, the phrase "in situ gelled acid" is intended to refer to an acidic fluid that has low viscosity when mixed at the surface and injected into the well but has a higher viscosity after some of the acid has been neutralized. Thus the low viscosity acidic precursor fluid is intended to be included in the term. The term "fiber" as used herein is used in the collective sense to refer to a number of individual filaments of a fiber of a certain description.

The formation-dissolving fluid that is pumped into the wellbore in alternation with the mixture of in situ gelled FTF and fiber can be any of many known fluids. For instance, in carbonate formations, the FDF may be, by non-limiting example, an inorganic acid (for example, hydrochloric acid), an organic acid (acetic and formic acid, for instance), or a mixture of organic acids, inorganic acids, or both, a self-diverting acid (SDA) of the type described below, an aminopolycarboxylic acid or acids such as hydroxyethylethylenediamine triacetic acid (optionally with another acid), an aminopolycarboxylic acid salt or salts such as hydroxyethylethylenediamine triacetate (optionally with another acid), or a mixture of an aminopolycarboxylic acid or acids and aminopolycarboxylic acid salt or salts (optionally with another acid). The FDF can also be a VDA of the type described above. In sandstones, the FDF preferably contains hydrofluoric acid (or a hydrofluoric acid precursor), and optionally contains a phosphonate. Selection of the particular FDF for use in connection with embodiments of the methods of the present invention depends upon the particular formation and many other parameters known to those skilled in the art and is not addressed further herein.

With regard to the mixture of fiber and in situ gelled acid, as noted above, the acid can be either an SDA or a VDA. An example of an SDA system is described in European Patent Application Publication No. 0 278 540 B 1. The initially strongly acidic system described in that European Patent Application initially has low viscosity but includes a soluble ferric ion source and a polymeric gelling agent that is cross-linked by ferric ions at a pH of about 2 or greater but not at lower pH's. The polymer is, for example, ethanaminium,N,N,N-trimethyl-methyl-oxo-chloride copolymer with propenamide (an anionic polyacrylamide) at temperatures below about 93° C.; or cationic polyacrylamide copolymer at temperatures above about 93° C. This polymer is not cross-linked by ferrous ions. Therefore, the system includes a reducing agent that reduces ferric ions to ferrous ions, but only at a pH above about 3 to 3.5. Consequently, as the acid spends, for example in a wormhole or fracture, and the pH increases to about 2 or greater, the polymer cross-links, and a very viscous gel forms that inhibits further flow of fresh acid into the wormhole or fracture. As the acid spends further (after the treatment) and the pH continues to rise, the reducing agent converts the ferric ions to ferrous ions and the gel reverts to a more water-like state. Hydrazine salts and hydroxylamine salts are most commonly the reducing agents.

Viscoelastic diverting acids (VDA's), comprised of a gelling agent, or primary surfactant, for example certain surfactants such as betaines, optionally a pH-sensitive co-surfactant and/or alcohol, and an acid, are described, for instance, in U.S. Pat. No. 6,667,280, and U.S. Patent Application Publication No. 2003-0119680, both of which are hereby incorporated herein in their entirety by these specific references thereto. The acid may be a mineral acid (for instance, hydrochloric or hydrofluoric acid) or an organic acid (acetic or formic acid, for instance). The co-surfactant is preferably a dodecylbenzene sulfonic acid or salt, and the gelling agent is preferably a zwitterionic surfactant, more preferably a betaine. Such systems are initially of very low viscosity, and therefore easily pumped, with low friction pressures and insensitive to shear, but once placed in the formation, the spending of the acid by reaction with minerals in the formation triggers an increase in viscosity, plugging flow channels such that, as additional VDA or formation treatment fluid is pumped into the formation, it is diverted away from the gel towards regions of lower permeability.

Examples of zwitterionic surfactants useful as components of VDA's have the following amide structure:

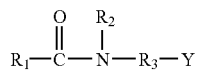

in which R1 is a hydrocarbyl group that may be branched or straight chained, aromatic, aliphatic, or olefinic and has from about 14 to about 26 carbon atoms and may contain an amine; R2 is hydrogen or an alkyl group having from 1 to about 4 carbon atoms; R3 is a hydrocarbyl group having from 1 to about 5 carbon atoms; and Y is an electron withdrawing group. Preferably the electron withdrawing group is a quaternary amine, sulfonate, carboxylic acid, or amine oxide. VDA's may also include additives such as those known in the art, for instance, corrosion inhibitors, iron reducing or control agents, and chelating agents.

Two examples of zwitterionic surfactants suitable for forming VDA's are betaines called, respectively, BET-O and BET-E. One is designated BET-O-30 because, as obtained from the supplier (Rhodia, Inc., Cranbury, N.J., U.S.A.), it is called Mirataine BET-O-30 because it contains an oleyl acid amide group (including a $C_{17}H_{33}$ tail group) and contains about 30% active surfactant; the remainder is substantially water, a small amount of sodium chloride, glycerol and propane-1,2-diol. An analogous material, BET-E-40, is also available from Rhodia and contains a erucic acid amide group (including a $C_{21}H_{41}$ tail group) and is 40% active ingredient with the remainder substantially water, a small amount of sodium chloride, and isopropanol. A generic betaine surfactant is shown below. These betaine surfactants are referred to herein as BET-O-30 and BET-E-40 (and generically as "BET surfactants"). The surfactants are supplied in this form, with an alcohol and a glycol, to aid in solubilizing the surfactant in water at high concentration, and to maintain it as a homogeneous fluid at low temperatures. However, the surfactants are also used in other forms. BET surfactants, and others, are described in U.S. Pat. No. 6,258,859. The generic chemical structure of these betaines is:

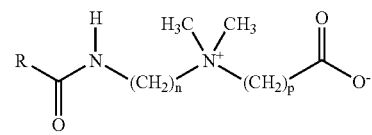

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Most preferably, the surfactant is the betaine in which R is the straight-chained olefinic group $C_{17}H_{33}$ (BET-O-30) or the straight-chained olefinic group $C_{21}H_{41}$ (BET-E-40), and n=3 and p=1.

These betaine surfactants can form aqueous, viscous high-temperature gels over a broad range of electrolyte concentration; they form gels with no added salt or even in heavy brines. The fluids can generally be prepared, for example, with municipal water, lake or creek water, or seawater. Co-surfactants may be useful in extending the brine tolerance, and to increase the gel strength and to reduce the shear sensitivity of the fluid, especially for BET-O. An example of such a co-surfactant is sodium dodecylbenzene sulfonate (SDBS). For a given surfactant and conditions (especially the temperature and the time for which a suitable viscosity is required), the salinity and the presence and nature of the co-surfactants can be adjusted in accordance with parameters known to those skilled in the art to ensure that the gel has the desired stability. Other additives, such as compatible corrosion inhibitors, stabilizers, shear stability enhancers, shear recovery additives, etc. may be added.

Other examples of suitable surfactants from which suitable VDA fluid systems may be made include other surfactants described in U.S. Pat. No. 6,667,280, for example amidoalkylamine oxides, such as erucylamidopropyl amine oxide.

Cationic surfactants that may be utilized in a VDA in accordance with the method of the present invention are quaternary amines such as erucyl bis-(2-hydroxyethyl)methyl ammonium chloride (EHAC) and other surfactants as listed in U.S. Patent Nos. 5,258,137, 5,551,516, and 5,924,295 all of which are hereby incorporated herein in their entireties by this specific reference. Cationic VDA's are described in U.S. Patent Application Publication No. 2005-0126786, also incorporated herein in its entirety by this specific reference. Such surfactants are mixed with a lower molecular weight alcohol such as isopropanol andlor propylene glycol and a water soluble salt, and may also include a co-surfactant, and additives such as those known in the art, for instance, corrosion inhibitors, iron reducing or control agents, and chelating agents.

The acid component of the SDA or VDA into which the fibers are mixed can be any organic or inorganic acid; by non-limiting example, mineral acids such as hydrochloric, hydrofluoric, fluoroboric, sulfuric, phosphoric, or nitric acid, or organic acids such as maleic, citric, acetic, or formic acid, and mixtures thereof. The rheology of the SDA or VDA is affected primarily by acid strength, not by the type of anion.

The fiber that is utilized in a mixture with the in situ gelled acid is for example of the type described in U.S. Patent Nos. 5,330,005, 5,439,055, 5,501,275, 6,172,011, and 6,599,863, and U. S. Patent Application Publication No. 2006-283,591published Dec. 21, 2006, the entire disclosures of which are incorporated herein by this specific reference. Briefly, as disclosed in those patents, the fiber can be of glass, ceramic, carbon, natural or synthetic polymer, or metal filaments. Other fibers such as polylactic acid, polyglycolic acid, and polyvinyl alcohol are also particularly suitable. In many cases it is a preferred method to choose a fiber that decomposes over a time period of from a few hours to a few days or weeks at the temperature of the formation so that after the treatment the fractures that have been blocked will become open once again to fluid flow.

Fiber thickness and length have been found to play a role in the ability of the fibers to function for the intended purpose in the method of the present invention. As a general rule, longer fibers (up to the limits imposed by the practicalities of mixing and pumping) are preferred, but satisfactory results are also achieved with fibers in the range of less than a centimeter in length. The diameter of the fiber likewise affects the function of the fiber in the method of the present invention. Satisfactory results are obtained with fibers having a diameter in the range of from a few microns up to several hundred microns; the fibers can be fibrillated. Nylon, aramid, polyamide, polypropylene, and other polymeric fibers as disclosed in the above-incorporated U.S. patents are also utilized to advantage, as are polylactic acid (PLA), PET, polyglycolic acid (PGA), and polyvinyl alcohol (PVA) fibers. In some instances there may be advantages to choosing fibers that eventually dissolve at the temperature of the formation, for example PLA at low temperatures and PET at higher temperatures. When this occurs, flow of fluids to the well at a later time is enhanced.

The fiber is added to in situ gelled acid in a proportion ranging from about 1.2 g/L (about 10 ppt (pounds per thousand gallons)) to about 18 g/L (about 150 ppt), for example from about 6 g/L (about 50 ppt) to about 8.4 g/L (about 70 ppt). The proportion and physical dimensions of the fiber, and the particular fiber utilized, depend on a number of variables, including the characteristics of the treatment fluid or in situ gelled acid, and the chemical and physical characteristics of the formation. For instance, longer fibers may be utilized in formations that are highly fractured and/or in which the naturally occurring fractures are quite large, and it may be advantageous to utilize higher concentrations of such fibers for use in such formations. For instance, as discussed further below, based on field treatments with a PET fiber for slickwater fracturing treatments (water plus friction reducer), addition of about 8.6 g/L (about 71 ppt) PET fiber is sufficient to screen out a fracturing treatment with a relatively narrow fracture of approximately 0.25 cm (0.1 inches). Increasing the fluid viscosity would not lead to as effective diversion in this case.

The procedural techniques for pumping the alternating stages of FDF and in situ gelled acid-fiber mixture down the wellbore in accordance with the method of the present invention to control leak-off of the FDF while stimulating a subterranean formation are well known. The person that designs fracturing treatments, for example, is the person of ordinary skill to whom this disclosure is directed. That person has many tools available to help design and implement fracturing treatments, one of which is a type of computer program commonly referred to as a fracture simulation model (also known as fracture models, fracture simulators, and fracture placement models). Most commercial service companies that provide fracturing services to the oilfield offer one or more such fracture simulation models; one commercial fracture simulation model that is used to advantage in connection with the method of the present invention is marketed under the trademark FracCADE®. This commercial computer program is a fracture design, prediction, and treatment-monitoring program available from Schlumberger Technology Corporation. As far as is known, the various fracture simulation models use information available to the treatment designer concerning the formation to be treated and the various treatment fluids (and additives) in the calculations, and the program output enables the user to adjust the pumping schedule that is used to pump the fracture stimulation fluids into the wellbore to obtain the desired results. The text "Reservoir Stimulation," Third Edition, Edited by Michael J. Economides and Kenneth G. Nolte, John Wiley & Sons (2000), is an excellent reference book for fracturing and other well treatments; it discusses fracture simulation models in Chapter 5 (pages 5-28) and the Appendix for Chapter 5 (page A-15). The total volume of fracturing fluid depends upon the desired dimensions of the fracture and the amount of fluid that leaks off.

Similarly, as is well known to those of ordinary skill in the art, the reactivity of the formation-dissolving fluid may be selected (for example with the use of fracture and/or acidizing simulator computer programs) on the basis of the flow rate and formation and fluid parameters. The reaction of the formation-dissolving fluid can be controlled by varying the rate of reaction, the rate of mass transfer, or both, as known in the art. For example, the rate of reaction can be decreased by changing the type of formation-dissolving fluid, by changing the form of the fluid from a solution to an emulsion, by adding appropriate salts (which change the equilibrium constant for the surface reaction), or by changing the pH of the formation-dissolving fluid. The rate of reaction can also be decreased by changing the physical, or processing conditions (e.g., by reducing the pump flow rate and/or pumping pressure, or by cooling the formation-dissolving fluid using external cooling means or internal cooling means (e.g., pumping a large pad stage or adding nitrogen or other inert gas in the process)).

The actual total volumes/unit wellbore length used in the various types of matrix stimulation treatments are dependant on many factors such as the zone height, the wellbore angle, the nature and extent of damage, the formation nature and heterogeneity, the size and number of natural fissures or fractures, the ability of the fluids to dissolve the formation, and other factors. In a typical matrix acidizing treatment, the total volume of formation dissolving fluid (not counting losses to fractures) is typically about 86 L/m of formation penetrated by the wellbore (about 75 gallons/foot). This might be for example the total of HCl and/or VDA and/or of VDA alternating with HCl with at least some of the stages containing fiber. This would achieve a penetration of about 1 to 1.5 m (about 3 to 5 feet), of course depending upon the formation porosity and the depth of the damage, if that is the reason for the treatment. The fluids may optionally be energized, for example with 44.5 L N2/L VDA (250 scf/bbl) nitrogen. A suitable acid, for example HCl, concentration is 15%; the useful range of acid, for example HCl, concentrations in VDA's is, for example, from about 10 to about 28%, for example from about 15 to about 28%. Of course much less or much more fluid may be used. Although much of this discussion has concentrated on HCl and HCl VDA, it must be remembered that many formation treatment fluids and many formation dissolving fluids may be used with fibers within the scope of the invention, with or without diversion, and that the volumes used are adjusted accordingly over a wide range.

Fibers may also be added to non-viscous fluids to aid in diversion and/or in blocking natural fractures, vugs and high permeability streaks. Non-viscous fluids are defined here as having a viscosity of less than about 25 cP at 170 sec$^{-1}$ at 25° C. before injection. Non-limiting examples of such fluids are slickwater, spacers, mutual solvents, flushes, formation dissolving fluids, scale dissolution fluids, paraffin dissolution fluids, asphaltene dissolution fluids, acids, and mixtures of such fluids. As an example, the addition of about 1.2 to about 18 μl (about 10 to about 150 pounds/1000 gallons) of fiber to slickwater is effective for bridging of natural fractures and diversion of the slickwater treatment. As another example, slickwater is often pumped at a high rate between acid stages as a means to clean out calcite and particles from the natural fissures within a carbonate. The use of fiber in the slickwater efficiently diverts the clean out system to additional fissures. Concentrations of approximately 12 g/L (100 pounds/1000 gallons) are particularly suitable.

The following methods are included among the embodiments of the present invention. Pre-flushes, spacers, post-flushes and the like are not discussed. In the following, any or all of the stages may be gelled, delayed, thickened, emulsified, or foamed. For matrix treatment: (A) a single stage treatment with an FTF with a fiber, and (B) alternating stages of an FTF and an FTF with a fiber, starting and ending with either stage. For acid fracturing: (A) a first pad stage that is an FTF with a fiber, followed by a second stage or multiple stages that are either an FDF or an FDF with a fiber (including alternating stages after the pad stage, starting and ending with either type of stage, and also including stages that are the same as the pad stage), and (B) a single stage treatment with an FDF with a fiber. For propped fracturing (including frac-packs): a first pad stage that is an FTF with a fiber, followed by proppant-laden stages with or without fiber in any proppant-laden stage. For water control: (A) a first stage containing a water control chemical or chemicals and a fiber, optionally followed by a second stage containing a water control chemical or chemicals, and (B) a first stage containing a water control chemical or chemicals, followed by a second stage containing a water control chemical or chemicals and a fiber. For diversion: (A) a foam with a fiber, (B) a self-diverting FTF with a fiber, and (C) an emulsion with a fiber.

The method may be applied in any well configuration: vertical, horizontal, or deviated; open hole or cased, or with slotted or perforated liners. Injection may be bullheaded, may be through jointed tubing or through coiled tubing.

The method of the present invention may be better understood by reference to the following non-limiting examples describing certain embodiments of the method, as well as the results of tests that have been found to be relevant to predicting the performance of acid treatments in a subterranean formation.

EXAMPLE 1

A hydraulic fracturing treatment was performed in a sandstone formation at about 129° C. (about 265° F.) using slickwater (water plus a polyacrylamide friction reducer). The treatment was pumped at 7.95 m$^3$/min (50 barrels/min (bpm)) and was intended to include proppant stages containing from 0.12 kg/L of fluid (1 PPA (pounds proppant added per gallon of fluid)) to 0.60 kg/L of fluid (5 PPA) of 0.43 to 0.84 mm (20/40 U.S. mesh) Ottawa Sand. At the start of the 0.30 kg/L (2.5 PPA) proppant stage, 6 mm long PET fibers at a concentration of about 8.6 g/L (about 71 lb/1,000 gal) were added. A rapid increase in treating pressure and a near-wellbore screenout occurred forcing job shutdown as the stage entered the formation several minutes later due to fiber/slurry bridging in the narrow fracture (less than about 0.25 cm (about 0.1 inches) in width) near the wellbore.

EXAMPLE 2

A laboratory test was performed with 15% VDA (15% HCl containing 6% by volume of a concentrate containing about 40% erucic amidopropyl dimethyl betaine in isopropanol and water) containing 8.4 g/L (70 ppt) of 6 mm long PLA fibers at 93.3° C. (200° F.). The mixture of in situ gelled acid (VDA) plus fibers was injected through a 0.3 cm (0.12 inch) wide by 2.54 cm (1 inch) high by 15.2 cm (6 inch) long fracture created between two halves of an Indiana Limestone core. The fluid was injected at a constant differential pressure of 0.17 MPa (25 psi) across the length of the fracture and the flow rate was monitored as a function of time as shown in FIG. 1. The flow rate was initially about 50 ml/min and decreased to about 8 ml/min within a minute of injection of VDA plus fibers. Hence, the rate of fluid loss decreased by a factor of about 6 as a result of using VDA plus fibers. The experiment shows that this fluid containing fibers and VDA was self-diverting when injected into this fracture. The fracture was shut in for 12 hours after the test. Upon final inspection of the fracture after the test, the PLA fibers were completely decomposed, leaving behind a clean fracture.

EXAMPLE 3

Figure 2:
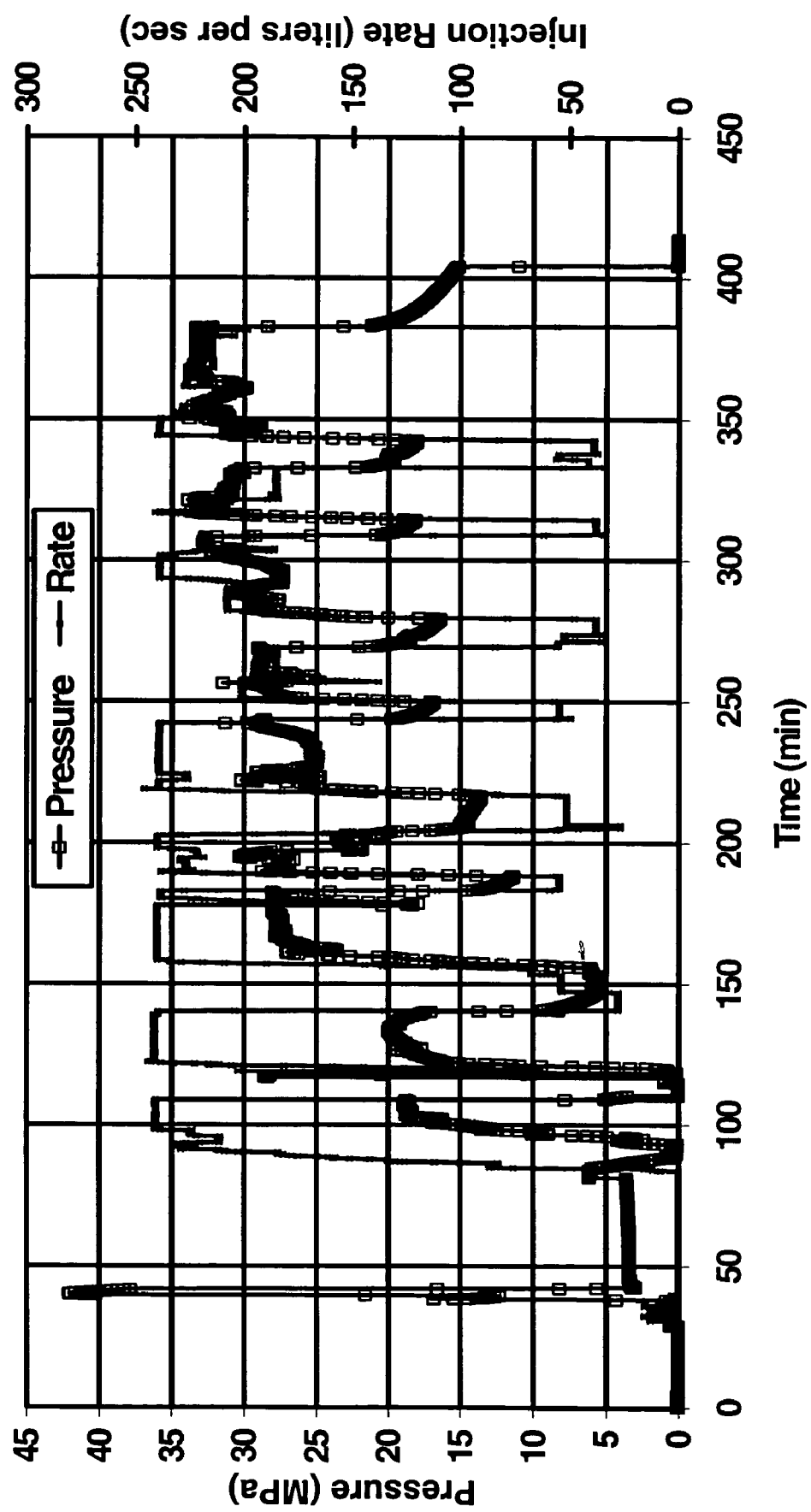
FIG. 2 shows field data from an acid fracturing treatment in which multiple stages of slickwater, HCl, and VDA were injected, with fibers added to some of the VDA and slickwater stages.

An acid fracturing treatment was performed in a naturally fractured carbonate formation. The treatment pumping schedule is shown in Table 1; the main treatment fluid was slickwater pumped at 12.7 m$^3$/min (80 barrels/min). Various other small stages of 15% HCl, 15% VDA diverter, slickwater containing mutual solvent, and slickwater spacer, were pumped at about 3.2 m³/min (20 barrels/min). The slickwater contained about 0.1 vol percent of a friction reducing polymer; 15% VDA means 15% HCl containing 6% by volume of a concentrate containing about 40% erucic amidopropyl dimethyl betaine in isopropanol and water; the slickwater with mutual solvent contained about 10% ethylene glycol monobutyl ether. The HCl and VDA stages contained corrosion inhibitor. Fibers were added the first three times at a concentration of 12 g/L (100 pounds/1000 gallons) and the last two times at 18 g/L (150 pounds/1000 gallons) in five of the stages, including three diversion stages (Table 1). The fibers were polylactic acid, about 6 mm long and about 1.4 denier. As can be seen from the job plot in FIG. 2, the use of fibers during various stages of the treatment gave significant pressure increases, up to 9 MPa (1300 psi), which was attributed to the efficient diversion properties of the fiber. (A previous treatment of the same well with slickwater, HCl, and VDA, without fiber had not shown pressure increases; the treating pressure had been approximately constant throughout the job.)

TABLE 1

| FLUID | LITERS | RATE (L/SEC) |
|---|---|---|
| Slickwater | 605,600 | 212 |
| 15% HCL | 7,570 | 53 |
| Slickwater Spacer | 3,785 | 53 |
| Slickwater/Mutual Solvent | 3,785 | 53 |
| Slickwater Spacer | 7,570 | 53 |
| 15% VDA (No Fiber) | 9,463 | 53 |
| Slickwater | 378,500 | 212 |
| Slickwater Fiber | 11,355 | 53 |
| Slickwater | 215,745 | 212 |
| Slickwater/Mutual Solvent | 3,785 | 53 |
| Slickwater Spacer | 7,570 | 53 |
| 15% VDA Fiber | 9,463 | 53 |
| Slickwater | 378,500 | 212 |
| Slickwater Fiber | 11,355 | 53 |
| Slickwater | 215,745 | 212 |
| Slickwater/Mutual Solvent | 3,785 | 53 |
| Slickwater Spacer | 7,570 | 53 |
| 15% VDA Fiber | 9,463 | 53 |
| Slickwater | 378,500 | 212 |
| Slickwater Fiber | 11,355 | 53 |
| Slickwater | 215,745 | 212 |
| Slickwater/Mutual Solvent | 3,785 | 53 |
| Slickwater Spacer | 7,570 | 53 |
| 15% VDA Fiber | 9,463 | 53 |
| Slickwater | 605,600 | 212 |
| FLUSH | 113,550 | 212 |

EXAMPLE 4

Figure 3:
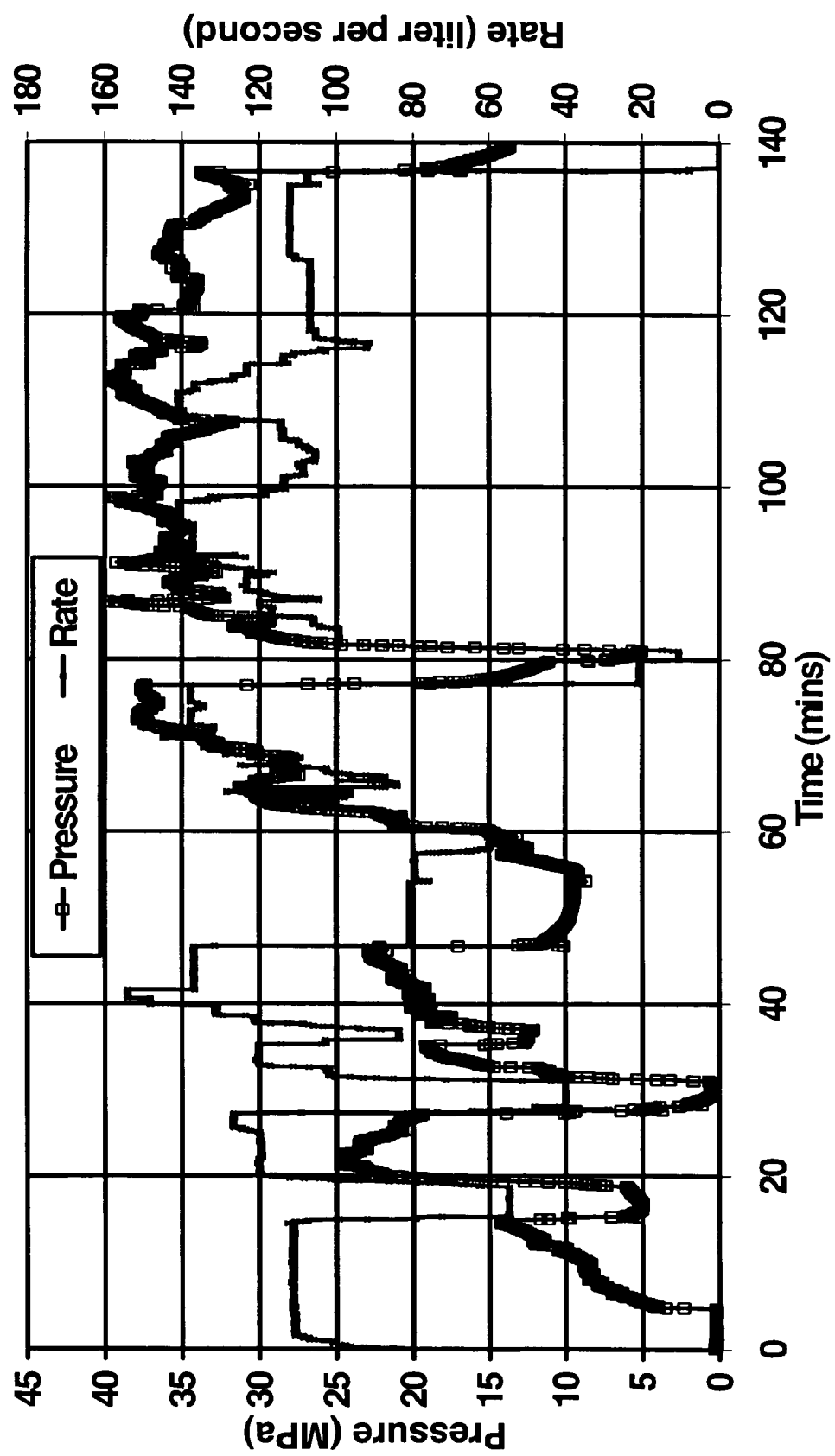
FIG. 3 shows field data from an acid fracturing treatment consisting of repeating stages of slickwater, HCl, linear gel, and slickwater plus fiber.

A second acid fracturing treatment was performed in a naturally fractured carbonate formation. The treatment was pumped using a different schedule from that of the job of Example 3. The job of Example 4 did not utilize VDA, but instead used alternating stages of slickwater, 15% HCl, gel and slickwater plus fiber. Table 2 shows the pumping schedule. The concentration of fiber was 12 g/L (100 pounds/1000 gallons) in each diversion stage. The slickwater and the fiber were the same as in Example 3. The gel was 7.2 g/L (60 ppt) linear guar. As can be seen from FIG. 3, a strong pressure response was seen after the fiber diverter stages had been pumped, with pressure increases of 10.3 MPa (1500 psi) and 15.9 MPa (2300 psi). Typical treatments in this area had used benzoic acid flakes for diversion, but had provided only limited increases in pressure (less than 3.5 MPa (500 psi)).

TABLE 2

| FLUID | LITERS | RATE (L/SEC) |
|---|---|---|
| SLICKWATER | 454206 | 371 |
| 15% HCL Acid | 12718 | 106 |
| SLICKWATER | 454206 | 371 |
| Fiber in SLICKWATER | 23847 | 132 |
| Gel Sweep | 12718 | 371 |
| SLICKWATER | 454206 | 371 |
| 15% HCL Acid | 12718 | 106 |
| SLICKWATER | 454206 | 371 |
| Fiber in SLICKWATER | 23847 | 132 |
| Gel Sweep | 12718 | 371 |
| SLICKWATER | 454206 | 371 |
| 15% HCL ACID | 12718 | 106 |
| SLICKWATER | 454206 | 371 |
| Fiber in SLICKWATER | 23847 | 132 |
| Gel Sweep | 12718 | 371 |
| SLICKWATER | 454206 | 371 |

Those skilled in the art who have the benefit of this disclosure will recognize that certain changes can be made to the steps of the method of the present invention without changing the manner in which those steps function to achieve their intended result. All such changes, and others that will be clear to those skilled in the art from this description, are intended to fall within the scope of the following, non-limiting claims. It will also be recognized that although the invention has been described in terms of wells for hydrocarbon production, it may be applied to other types of wells, e.g. injection or storage wells, and may be used in the production, storage and disposal of other materials such as water, helium, and carbon dioxide.

What is claimed is:

1. A method of treating a subterranean formation penetrated by a wellbore comprising the steps of:
    (a) preparing a proppant-free mixture comprising a formation treatment fluid comprising a self-diverting acid or viscoelastic diverting acid and a fiber; and
    (b) injecting the mixture of formation treatment fluid and fiber into the formation through the wellbore, and allowing said acid to increase in viscosity to become a gelled acid;
wherein the formation treatment fluid has a viscosity of less than about 25 cP at 170 sec$^{-1}$ at 25° C. before injection.

2. The method of claim 1 wherein the mixture of formation treatment fluid and fiber is injected into the formation at a pressure greater than the formation fracture pressure.

3. The method of claim 1 wherein the formation treatment fluid is selected from the group consisting of slickwater, spacers, mutual solvents, flushes, formation dissolving fluids, fracturing fluids, scale dissolution fluids, paraffin dissolution fluids, asphaltene dissolution fluids, diverter fluids, water control agents, chelating agents, viscoelastic diverting acids, self-diverting acids, acids, and mixtures thereof.

4. The method of claim 1 wherein the mixture of acid and fiber is injected into the formation at a pressure greater than the formation fracture pressure.

5. A method of treating a subterranean formation comprising the steps of:
    (a) contacting a subterranean formation with a first formation treatment fluid selected from the group consisting of slickwater, spacers, mutual solvents, flushes, formation dissolving fluids, fracturing fluids, scale dissolution fluids, paraffin dissolution fluids, asphaltene dissolution fluids, diverter fluids, water control agents, chelating agents, viscoelastic diverting acids, self-diverting acids, acids, and mixtures thereof; and (b) contacting the subterranean formation with a mixture of a proppant-free second formation treatment fluid and a fiber to divert the second formation treatment fluid from a naturally fractured zone in the formation, wherein the proppant-free second formation treatment fluid has a viscosity of less than about 25 cP at 170 sec$^{-1}$ at 25° C. before injection.

6. The method of claim 5 wherein at least one of steps (a) and (b) is conducted at a pressure greater than the formation fracture pressure.

7. The method of claim 5 further comprising repeating steps (a) and (b).

8. The method of claim 7 wherein steps (a) and (b) are conducted at a pressure greater than the formation fracture pressure.

9. The method of claim 8 wherein at least one of steps (a) comprises proppant and no fiber.

10. The method of claim 5 wherein the second formation treatment fluid comprises a formation dissolving fluid.

11. The method of claim 10 wherein the formation dissolving fluid comprises acid which increases in viscosity to become a gelled acid after placement in the formation.

12. A method of treating a subterranean formation comprising the steps of:
  a) contacting the formation with a formation dissolving fluid selected from the group consisting of slickwater, spacers, mutual solvents, flushes, formation dissolving fluids, fracturing fluids, scale dissolution fluids, paraffin dissolution fluids, asphaltene dissolution fluids, diverter fluids, water control agents, chelating agents, viscoelastic diverting acids, self-diverting acids, acids, and mixtures thereof, and
  b) contacting the subterranean formation with a mixture of a proppant-free formation dissolving fluid comprising a self-diverting acid or a viscoelastic acid and a fiber to divert the formation dissolving fluid from a naturally fractured zone in the formation, wherein the acid is injected into the wellbore at low viscosity and allowed to increase in viscosity to become a gelled acid;

wherein the fiber is mixed with the acid at a concentration ranging from about 1.2 to about 18 g/L.

13. The method of claim 12 wherein the first formation treatment fluid and the second formation treatment fluid are the same.

14. The method of claim 12 wherein the first formation treatment fluid and the second formation treatment fluid are different.

15. In a method of treating a subterranean formation, the improvement comprising alternately contacting the subterranean formation with a first formation treatment fluid selected from the group consisting of slickwater, spacers, mutual solvents, flushes, formation dissolving fluids, fracturing fluids, scale dissolution fluids, paraffin dissolution fluids, asphaltene dissolution fluids, diverter fluids, water control agents, chelating agents, viscoelastic diverting acids, self-diverting acids, acids, and mixtures thereof, and contacting said formation with a mixture of a proppant-free formation treatment fluid comprising an acid and a fiber, wherein the acid is selected from the group consisting of self-diverting acids and viscoelastic acids wherein the fiber is mixed with the acid at a concentration ranging from about 1.2 to about 18 g/L.

16. The method of claim 15 wherein the fluid is a low viscosity acid precursor fluid.

* * * * *